(12) United States Patent
Kalevo et al.

(10) Patent No.: US 6,904,169 B2
(45) Date of Patent: Jun. 7, 2005

(54) METHOD AND SYSTEM FOR IMPROVING COLOR IMAGES

(75) Inventors: Ossi Kalevo, Toijala (FI); Henry Rantanen, Tampere (FI)

(73) Assignee: Nokia Corporation, Espoo (FI)

( * ) Notice: Subject to any disclaimer, the term of this patent is extended or adjusted under 35 U.S.C. 154(b) by 607 days.

(21) Appl. No.: 10/008,577

(22) Filed: Nov. 13, 2001

(65) Prior Publication Data

US 2003/0091232 A1 May 15, 2003

(51) Int. Cl.$^7$ ................................................ G06K 9/00
(52) U.S. Cl. ..................................... 382/167; 382/260
(58) Field of Search ................................ 382/162, 167, 382/149, 260, 266, 275; 358/518; 348/607

(56) References Cited

U.S. PATENT DOCUMENTS

| | | | |
|---|---|---|---|
| 4,734,759 A | | 3/1988 | Kobori et al. ................. 358/75 |
| 5,715,335 A | * | 2/1998 | De Haan et al. ............ 382/261 |
| 6,091,862 A | | 7/2000 | Okisu ......................... 382/300 |
| 6,147,707 A | | 11/2000 | Terasawa et al. ........... 348/229 |
| 2002/0051145 A1 | * | 5/2002 | Watanabe et al. ............ 358/1.9 |
| 2003/0007699 A1 | * | 1/2003 | Trifonov et al. ............ 382/275 |

OTHER PUBLICATIONS

"Digital Image Processing", R. C. Gonzalez et al., pp. 189–201, Addison Wesley Longman, 1993.
IEEE 0–7803–6622–0/01; Bosco et al.; "Adaptive filtering for image denoising"; pp. 208–209; Jun. 19, 2001.

* cited by examiner

*Primary Examiner*—Phuoc Tran
(74) *Attorney, Agent, or Firm*—Ware, Fressola, Van Der Sluys and Adolphson LLP

(57) ABSTRACT

A method and system for improving a color image separable into three color components. A noise-filtering unit is used to filter the color components for providing noise-filtered color components. The edge information extracted from one color component is used to adjust the noise-filtered color component of a different color. The algorithm for noise filtering of color components can be based on linear spatial filters, non-linear filters or the combinations thereof. The algorithm for edge detection can be based on directional or non-directional spatial filters.

31 Claims, 5 Drawing Sheets

| R | G | R | G | R |
|---|---|---|---|---|
| G | B | G | B | G |
| R | G | R | G | R |
| G | B | G | B | G |
| R | G | R | G | R |

FIG. 1

|   | B3 | C | B4 |   |
|---|----|---|----|---|
| R3 | E | R1 | F | R5 |
| A | B1 | O | B2 | B |
| R4 | G | R2 | H | R6 |
|   | B5 | D | B6 |   |

FIG. 2A

|   | R3 | C | R4 |   |
|---|----|---|----|---|
| B3 | E | B1 | F | B5 |
| A | R1 | O | R2 | R |
| B4 | G | B2 | H | B6 |
|   | R5 | D | R6 |   |

FIG. 2B

| E |    | C  |    | F |
|---|----|----|----|---|
|   | B1 | G1 | B2 |   |
| A | G2 | O  | G3 | B |
|   | B3 | G4 | B4 |   |
| G |    | D  |    | H |

FIG. 3A

| E |    | C  |    | F |
|---|----|----|----|---|
|   | R1 | G1 | R2 |   |
| A | G2 | O  | G3 | R |
|   | R3 | G4 | R4 |   |
| G |    | D  |    | H |

FIG. 3B

| G1 | B  |
|----|----|
| B  | G2 |

FIG. 4

| W1 | W2 | W3 |
|----|----|----|
| W4 | W5 | W6 |
| W7 | W8 | W9 |

FIG. 9A

| W1 | W2 | W3 |
|----|----|----|
| W4 | W5 | W'6 |
| W7 | W8 | W9 |

FIG. 9B

METHOD AND SYSTEM FOR IMPROVING COLOR IMAGES

FIELD OF THE INVENTION

The present invention relates generally to image processing and, more particularly, to noise filtering a color image.

BACKGROUND OF THE INVENTION

Noise reduction in image processing is widely known, and methods for noise reduction are abundant. In the past, different noise reduction methods were often adapted to filter out a specific type of noise. For example, non-linear filters, such as median filters, are well suited for filtering out "shot noise", which affects the pixel value of individual pixels in a random fashion, whereas linear filters, such as mean filters, are better suited for filtering out Gaussian noise. These filters are, in effect, low-pass filters to be used to blur the image. Thus, the size of the pixel array, or stencil, of the filters is generally kept small so that the blurring does not significantly degrade the image.

With the advent of digital cameras, a new type of pixel sampling scheme (Bayer matrix) has become popular, where only a subset of the pixels is sampled for each color component. Before the images taken through a Bayer matrix can be used, the color components have to be up-sampled by means of interpolation. The format of images taken through a Bayer matrix is shown in FIG. 1. When color components are separated from the Bayer matrixed image as shown, each color component has many missing pixels and the pixel locations of one color component are different from the pixel locations of another color component. As shown in FIG. 1, one half of the pixel lines in a Bayer matrixed image contain blue color pixels interlaced with green color pixels, and the other half of the pixel lines contain red color pixels interlaced with green color pixels. Thus, the missing pixels in the color components are 50% in the green component, and 75% in either the red or blue component. The interpolation of each color component, known as color filter array (CFA) interpolation or de-mosaic interpolation, smears the noise from a pixel to neighboring pixels. As a result, conventional noise filtering methods become less effective in filtering out noise in such a digital image. Furthermore, when the conventional noise-filtering methods are applied directly on the color components prior to CFA interpolation, the stencil for the noise filters must be widened because of the missing pixels. As a result, extensive blurring occurs, especially around the edge-like structures in the image. When color filtering is applied to an interpolated image, approximately three times as much processing power is required to carry out the filtering operation compared to performing the filtering before the interpolation.

Okisu (U.S. Pat. No. 6,091,862) discloses a method and device for pixel interpolation in the "up-sampling" process to fill in the pixel value of the missing pixels. According to the method of Okisu, when the pixel value of a missing pixel in a color component is calculated for pixel interpolation, the slopes of pixel values in the same color component around that pixel are used to provide pixel weighting factors in order to improve the interpolated result. While Okisu can reduce smoothing of edges, its effect is limited because of the missing pixels in the color component under pixel interpolation.

Noise filtering a color component using only the pixel values of the same color is known, especially when a mean filter or a median filter is used. FIGS. 1 to 3b are used to illustrate how different noise reduction filters can be used to filter different color components. FIGS. 1 to 3b show a section of a color image taken through a Bayer matrix. In particular, FIG. 2a shows a section of the Bayer matrixed image with relevant pixels used when a green pixel in a blue line is filtered. FIG. 2b shows a section of the Bayer matrixed image with relevant pixels when a green pixel in a red line is filtered. In both FIGS. 2a and 2b, the pixel value of the green pixel to be filtered is denoted by the letter O. The pixel values of the surrounding green pixels are denoted by letters A, B, C, D, E, F, G and H, whereas the pixel values of the surrounding red and blue pixels are denoted by R1–R6, B1–B6.

To noise filter the green color component, for example, only the pixel value of green pixels is used. To generalize the noise filtering process, it can be said that the green pixel having the pixel value O is filtered by a filter F( ), and the pixel value of the filtered pixel is denoted by a notation F(O). If the pixels to be used in noise filtering are confined to the area as shown in FIGS. 2a or 2b, then the filter F( ) is a combination of pixel values selected only from A, B, C, D, E, F, G and H. The filter F( ) is not part of the present invention. Thus, F( ) can be a prior art noise filter or any combination of prior art filters, or even any novel filter suitable for noise reduction.

Likewise, when a red color component is subject to noise filtering, only the pixel value of red pixels is used. When a blue color component is subject to noise filtering, only the pixel value of the blue pixels is used. FIG. 3a shows a section of the Bayer matrixed image with relevant pixels when a red pixel is filtered. In FIG. 3a, the pixel values of the surrounding red pixels are denoted by letters A, B, C, D, E, F, G and H, whereas the pixel values of the surrounding green and blue pixels are denoted by G1–G4 and B1–B4. FIG. 3b shows a section of the Bayer matrixed image with relevant pixels when a blue pixel is filtered. In FIG. 3b, the pixel values of the surrounding blue pixels are denoted by letters A, B, C, D, E, F, G and H, whereas the pixel values of the surrounding green and red pixels are denoted by G1–G4 and R1–R4.

In prior art, there are two different classes of spatial noise reduction filters used. One is classified as nonlinear and the other linear. A median filter is an example of the non-linear filter, and a mean filter is an example of the linear filter. The combination of a non-linear filter and a linear filter is another non-linear filter, which can also be used in noise filtering. A median filter effectively removes impulsive noise, whereas a mean filter effectively removes Gaussian noise. For a human observer, sharp edges are important due to the properties of the Human Visual System (HVS). Thus, the implementation of filters should take into account not only the noise reduction aspect but also the edge preservation aspect of the filtering process. Furthermore, low processing power and low memory consumption should also be considered and, therefore, the size of the filter window must be as small as possible. As presented above, combining these two requirements is a problem in methods of prior art.

1.0 Multistage Median Filter

The multistage median filter, as described below, consists of line- and edge-preserving properties, and it still effectively reduces noise. The basic components of this multistage median filter consist of four elements: a five-point "+"-median filter, a five-point "x"-median filter, the original pixel and a three-point median filter of the previous three.

Thus, when a pixel having the pixel value O as shown in FIGS. 2a to 3b, we have:

$$\text{"+"-med} = \text{median5}(O, A, B, C, D) \quad (1.1)$$

$$\text{"×"-med} = \text{median5}(O, E, F, G, H) \quad (1.2)$$

$$\text{original} = O \quad (1.3)$$

$$\text{output value} = F(O) = \text{median3}(\text{"+"-med, "×"-med, original}) \quad (1.4)$$

This filter reduces impulse-like noise effectively, and it can be used to attenuate Gaussian noise as well. Edges and lines are also effectively preserved.

2.0 Mean Filter

A mean filter usually consists of a structure, where the weighted average of pixels is calculated. Usually, only the nearest pixels are used in the filter window. Thus, the smoothing of edges and lines is minimal and effective noise reduction properties are preserved. Mean filters can be classified into non-directional and directional filters, as described below.

2.1 Non-directional Mean Filter

When green pixels are filtered (FIG. 2a or 2b), we can use, for example:

$$\text{output}G = (4*O + E + F + G + H)/8 \quad (2.1.1)$$

When red (or blue) pixels are filtered (FIG. 3a or 3b), we can use, for example:

$$\text{output}C = (4*O + A + B + C + D)/8 \quad (2.1.2)$$

This filter reduces Gaussian noise effectively and attenuates impulse-like noise. However, being a non-directional filter, this mean filter does not effectively preserve lines and edges.

2.2 Directional Mean Filter

In order to preserve edges and lines more effectively, it is preferred to use directional mean filters as follows:

The green pixels are filtered using, e.g., one of two following filters (FIGS. 2a and 2b):

$$\text{output1}G = (2*O + E + H)/4 \quad (2.2.1)$$

or $$\text{output2}G = (2*O + F + G)/4. \quad (2.2.2)$$

The red (or blue) pixels are filtered using, for example, one of the two following filters (FIGS. 3a and 3b):

$$\text{output1}C = (2*O + A + B)/4 \quad (2.2.3)$$

or $$\text{output2}C = (2*O + C + D)/4. \quad (2.2.4)$$

Lowpass spatial filters, similar to those described hereinabove, and highpass spatial filters can be found in "Digital Image Processing" by R. C. Gonzalez and R. E. Woods (Addison Wesley Longman, 1993, pp. 189–201).

SUMMARY OF THE INVENTION

Based on what has been presented above, it is advantageous and desirable to provide a method and system for noise filtering a digital image, wherein the pixel value of a pixel in a color component is adjusted not only based on the pixel values of nearby pixels in the same color components, but also based on the pixel values of nearby pixels in different color components.

The first aspect of the present invention is a method of improving an image separable into at least a first color component and a second color component, wherein the first color component has pixels located at a plurality of first pixel locations and a second color component has pixels located at a plurality of second pixel locations. The method comprises the steps of:

noise filtering the first color component using pixel values of the first color component for providing a noise-filtered color component having filtered pixel values at the plurality of first pixel locations, and adjusting the filtered pixel value of at least one first pixel location of the noise-filtered color component using information indicative of a difference in pixel values of the second color component at the second pixel locations adjacent to said at least one first pixel location.

According to the present invention, the difference in the pixel values is indicative of an edge in the image.

According to the present invention, the image has a first number of pixels and at least one of the first and second color components has at most a second number of pixels smaller than the first number. Preferably, the plurality of first pixel locations are different from the plurality of second pixel locations. It is also possible that the first pixel locations partially overlap with the second pixel locations.

According to the present invention, the image is separable into three color components of red, green and blue. When the first color component is the green component, the second color component is the red or blue component, and when the first color component is the blue or red component, the second color component is the green component.

The second aspect of the present invention is a device for improving an image separable into at least a first color component and a second color component, wherein the first color component has pixels located at a plurality of first pixel locations and a second color component has pixels located at a plurality of second pixel locations. The device comprises:

a filtering unit, for noise filtering the first color component using pixel values of the first color component for providing a noise-filtered color component having filtered pixel values at the plurality of first pixel locations and for providing signals indicative of the noise-filtered color component; and an adjusting unit, responsive to the signals, for adjusting the filtered pixel value of at least one first pixel location of the noise-filtered color component using information indicative of a difference in pixel values of the second color component at the second pixel locations adjacent to said at least one first pixel location.

The third aspect of the present invention is a computer program for improving an image separable into at least a first color component and a second color component, wherein the first color component has pixel values located at a plurality of first pixel locations and the second color component has pixel values located a plurality of second pixel locations. The computer program comprises:

a first algorithm for noise filtering the first color component using pixel values of the first color component for providing a noise-filtered first color component having filtered pixel values at the plurality of first pixel locations, and a second algorithm, for adjusting the filtered pixel value of at least one first pixel location of the noise-filtered first color component using information indicative at least of a difference in pixel values of the second color component at the second pixel locations adjacent to said at least one first pixel location.

The fourth aspect of the present invention is an image processing system having a color separation device for separating an image into at least a first color component and a second color component for providing a first signal indicative of the first color component and a second signal indicative of the second color component, wherein the first color component has pixels located at a plurality of first pixel locations and the second color component has pixels located at a plurality of second pixel locations. The system comprises:

a filtering unit, responsive to the first signal, for noise filtering the first color component using pixel values of the first color component for providing a noise-filtered color component having filtered pixel values at the plurality of first pixel locations and for providing a third signal indicative of the noise-filtered color component;

an edge detection unit, responsive to the second signal, for providing information indicative at least of a difference in pixel values of the second color component; and an adjustment device, responsive to the third signal and the information, for adjusting the filtered pixel value of at least one first pixel location of the noise-filtered color component based on the difference in pixel values at the second pixel locations adjacent to said at least one first pixel location.

The fifth aspect of the present invention is a method of improving an image separable into at least a first color component and a second color component using a noise filter, wherein the first color component has pixels located at a plurality of first pixel locations and a second color component has pixels located at a plurality of second pixel locations, and wherein the noise filter comprises a plurality of filter parameters. The method comprises the step of adjusting at least one of the filter parameters in the noise filter for noise filtering the first color component using pixel values of the first color component for providing a noise filtered color component having filtered pixel values at the plurality of the first pixel locations, wherein said adjusting is based on information indicative of a difference in pixel values of the second color component at the second pixel locations adjacent to at least one first pixel location for providing the filtered pixel value of said at least one first pixel location.

The sixth aspect of the present invention is a device for improving an image separable into at least a first color component and a second color component using a noise filter, wherein the first color component has pixels located at a plurality of first pixel locations and a second color component has pixels located at a plurality of second pixel locations, and wherein the noise filter comprises a plurality of filter parameters for filtering the first color component using pixel values of the first color component for providing a noise-filtered first color component having filtered pixel values at the plurality of first locations. The device comprises a module, capable of modifying the noise filter before or during the filtering of the first color component, by adjusting at least one filter parameter using information indicative of a difference in pixel values of the second color component at the second pixel locations adjacent to at least one first pixel location, for providing the filtered pixel value of said at least one first pixel location.

The seventh aspect of the present invention is a computer program for improving an image separable into at least a first color component and a second color component using a noise filter, wherein pixels of the first color component are located at a plurality of first pixel locations and pixels of the second color component are located a plurality of second pixel locations, and wherein the noise filter comprises a plurality of filter parameters. The computer program comprises an algorithm for noise filtering the first color component using pixel values of the first color component for providing a noise-filtered first color component having filtered pixel values at the plurality of first pixel locations, wherein information indicative of a difference in pixel values of the second color component at the second pixel locations adjacent to at least one first pixel location is used to adjust at least one of the filter parameters of the noise filter for providing the filtered pixel value of said at least one first pixel location.

The eighth aspect of the present invention is an image processing system having a color separation device for separating an image into at least a first color component and a second color component for providing a first signal indicative of the first color component and a second signal indicative of the second color component, wherein the pixels of the first color component are located at a plurality of first pixel locations and the pixels of the second color component are located at a plurality of second pixel locations. The system comprises:

an edge detection unit, responsive to the second signal, for providing information indicative at least of an edge in the image, for providing a third signal indicative of the information; and a filtering unit using a noise filter having a plurality of filter parameters for noise filtering at least the first color component for providing a noise-filtered first color component having filtered pixel values at the plurality of first pixel locations, responsive to the signal, for adjusting at least one of the filter parameters in the noise filter before or during the filtering of the first color component based on the information.

According to the present invention, the information is based on a difference in pixel values of the second color component at the pixel locations adjacent to at least one first pixel location and the adjusting is for providing the filtered pixel value of the at least one first pixel location.

The ninth aspect of the present invention is a method of improving an image using a noise filter having a plurality of filter parameters, wherein the image comprises a sequence of image frames of which at least one frame has at least one preceding frame, and each of said at least one frame and said at least one preceding frame is separable into at least a first color component and a second color component, and wherein the first color component has pixels located at a plurality of first pixel locations and a second color component has pixels located at a plurality of second pixel locations. The method comprises the step of adjusting at least one of the filter parameters in the noise filter for noise filtering the first color component of said at least one frame using pixel values of the first color component for providing a noise-filtered color component having filtered pixel values at the plurality of first pixel locations, wherein said adjusting is based on information indicative of a difference in pixel values of the second color component of said at least one preceding frame at the second pixel locations adjacent to at least one first pixel location for providing the filtered pixel value of said at least one first pixel location.

The tenth aspect of the present invention is a device for improving an image using a noise filter, wherein the image comprises a sequence of image frames of which at least one frame has at least one preceding frame, and each of said at least one frame and said at least one preceding frame is separable into at least a first color component and a second color component, and the first color component has pixels located at a plurality of first pixel locations and a second color component has pixels located at a plurality of second pixel locations, and wherein the noise filter comprises a plurality of filter parameters for filtering the first color component of said at least one frame using pixel values of the first color component for providing a noise-filtered color component having filtered pixel values at the plurality of first pixel locations. The device comprises a module, capable of modifying the noise filter before or during the filtering of the first color component of said at least one frame, by adjusting at least one of the filter parameters in the noise filter using information indicative of a difference in pixel values of the second color component of said at least one preceding frame at the second pixel locations adjacent to at least one first pixel location, for providing a modified noise filter for filtering the first color component of said at least one frame for providing the filtered pixel value of said at least one first pixel location.

The present invention will become apparent upon reading the description taken in conjunction with FIGS. 1 to 9b.

BRIEF DESCRIPTION OF THE DRAWINGS

FIG. 1 is a diagrammatic representation showing a section of a color image obtained through a Bayer matrix.

FIG. 2a is a diagrammatic representation showing a section of the color image when a green pixel in a blue line is filtered.

FIG. 2b is a diagrammatic representation showing a section of the color image when a green pixel in a red line is filtered.

FIG. 3a is a diagrammatic representation showing a section of the color image when a red pixel is filtered.

FIG. 3b is a diagrammatic representation showing a section of the color image when a blue pixel is filtered.

FIG. 4 is a diagrammatic representation showing a macropixel.

FIG. 9a is a matrix representing a noise filter with a plurality of filter parameters.

FIG. 9b is a matrix representing a noise filter wherein one of the filter parameters is adjusted based on edge information.

BEST MODE TO CARRY OUT THE INVENTION

Figure 5:
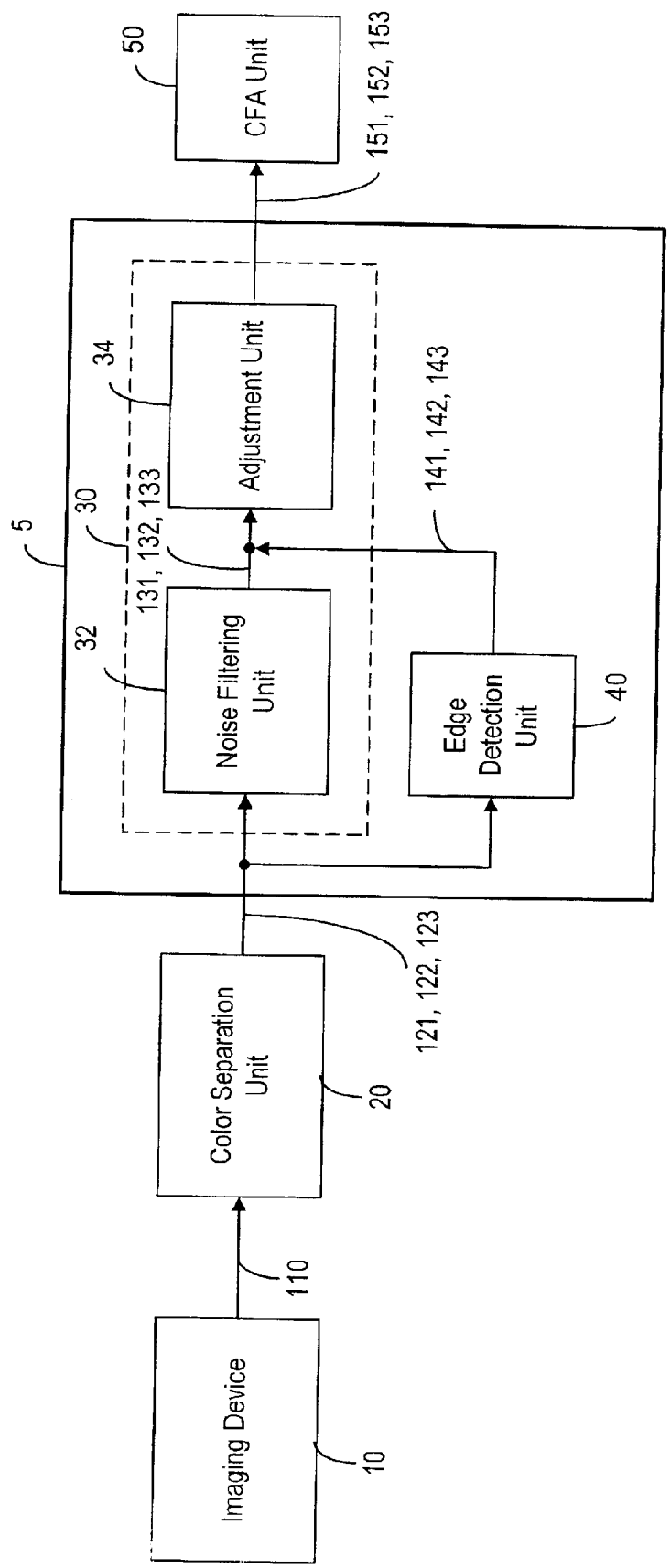
FIG. 5 is a block diagram showing a system for noise filtering a color image, according to the present invention.

There are two embodiments of the present invention, depending on the characteristics of the Bayer matrixed image to be filtered. A Bayer matrixed image can be considered as an image consisting of a plurality of macropixels containing four original pixels, as shown in FIG. 4. When there is no significant difference between picture elements G1 and G2, in terms of the elements themselves, then a first embodiment is preferred. Otherwise, a second embodiment is preferred. It should be noted that the difference between G1 and G2 at a location can arise from a number of factors. For example, it can be the result of the Bayer color filter, the sensitivity and response of the pixels, the amplification of the pixel response and so forth, although the color of the object at that location is substantially the same. However, the difference resulted from these factors is usually quite insignificant.

A. First Preferred Embodiment

The image is processed using a multistage median filter, as described in subsection (1.0). The algorithm for the first embodiment involves two threshold values, Thr1 and Thr2. Thr1 and Thr2 are noise-dependent values. It is preferred that Thr1=8 and Thr2=12, but they can be set equal to different values. The values of the thresholds can even be different in different parts of the image. It is assumed here that the pixel values can be expressed with 8 bits, but the bit depth of the pixel values can be any other value, as well. If the bit depth is different from 8 bits, the threshold values can be changed accordingly.

A.1 Noise Filtering of Green Color Component

When the green pixel is filtered (FIG. 2a or 2b), the algorithm is as follows:

If
    absolute value of (R1−R2) is greater than Thr1 or
    absolute value of (B1−B2) is greater than Thr1
then
    the output value is clipped to values between (Original−Thr2) and (Original+Thr2).
Otherwise
    the output value is not clipped.
where
    Original=O
    output value=median3("+"-med, "×"-med, Original) (see Subsection 1.0)

A.2 Noise Filtering of Red or Blue Color Component

When a red (or blue) pixel is filtered (FIG. 3a or 3b), the algorithm is as follows:

If
    absolute value of (G1−G4) is greater than Thr1 or
    absolute value of (G2−G3) is greater than Thr1
then
    the output value is clipped to values between (Original−Thr2) and (Original+Thr2).
Otherwise
    the output value is not clipped.
where
    Original=O
    output value=median3("+"-med, "×"-med, Original) (see Subsection 1.0)

B. Second Preferred Embodiment

The second preferred embodiment can be described as having two steps. The first step involves the calculation of a temporary output value of the filter to be used, and the second step involves the clipping of the temporary output value.

B.1 Noise Filtering of Green Color Component

When a green color component is filtered, it is preferred that the threshold values are Thr1=6, thr2=4 and thr3=28, but they can be set equal to different values. The values of the thresholds can even be different in different parts of the image. It is assumed here that the pixel values can be expressed with 8 bits, but the bit depth of the pixel values can be any other value. If the bit depth is different from 8 bits, the threshold values can be changed accordingly.

B.1.1 Calculation of Temporary Output Value of Filter
If
  abs((E+H)−(F+G)) is smaller than or equal to Thr1
then
  TEMPG=outputG (see Subsection 2.1)
otherwise
  if

SUM(E−H)<SUM(F−G), then

TEMPG=output1G otherwise

TEMPG=output2G

Where:

SUM(E−H)=abs(2*O−(E+H))+2*abs(E−H)+abs((B1+B3)−(B2+B6))/2+abs((R1+R3)−(R2+R6))/2.

SUM(F−H)=abs(2*O−(F+G))+2*abs(F−G)+abs((B1+B5)−(B2+B4))/2abs((R1+R5)−(R2+R4))/2.

Above, the notation abs( ) indicates an absolute value.
B.1.2 Clipping of the Temporary Output Value of Filter
If
  abs(Original−TEMPG) is larger than thr2
then
  If MADDG>Thr3 then

LIMIT=Thr2 otherwise

LIMIT=Thr3−MADDG+Thr2

Output value=TEMPG clipped to a value between (Original−LIMIT) and (Original+LIMIT)

otherwise

Output value=TEMPG (not clipped).

where

MADDG=MAX(abs(R1−R2), abs(B1−B2), abs(E−H), abs(F−G), abs(A−B)/2, abs(C−D)/2).

Above, the notation abs( ) indicates an absolute value and MAX(x,y,z) indicates the largest of x, y and z.
B.2 Noise Filtering of Red and Blue Color Components
When a red or blue color component is filtered, it is preferred that Thr1 is 4, thr2 is 3 and thr3 is 29.
B.2.1 Calculation of Temporary Output Value of Filter
If abs((A+B)−(C+D)) is smaller than or equal to Thr1 then

TEMPC=outputC (see Subsection 2.1)

otherwise
  if

SUM(A−B)<SUM(C−D), then

TEMPC=output1C otherwise

TEMPC=output2C

Where:

SUM(A−B)=abs(2*O−(A+B))+2*abs(A−B)+abs(G2−G3)

SUM(C−D)=abs(2*O−(C+D))+2*abs(C−D)+abs(G1−G4)

Above, the notation abs( ) indicates an absolute value.
B.2.2 Clipping of the Temporary Output Value of Filter
If abs(Original−TEMPC) is larger than Thr2 then
  If

MADDC>Thr3 then

LIMIT=Thr2 otherwise

LIMIT=Thr3−MADDC+Thr2

Output value=TEMPG clipped to a value between (Original−LIMIT) and (Original+LIMIT)

otherwise

Output value=TEMPG (not clipped).

Wherein
  If directional filter is used in A-B direction, then MADDC=MAX(abs(G1−G4), abs(G2−G3), abs(B1−B4), abs(B2−B3), abs(A−B)/2), for the red color component, and MADDC=MAX(abs(G1−G4), abs(G2−G3), abs(R1−R4), abs(R2−R4), abs(A−B)/2), for the blue color component;
and
  If directional filter is used in C-D direction, then MADDC=MAX(abs(G1−G4), abs(G2−G3), abs(B1−B4), abs(B2−B3), abs(C−D)/2), for the red color component, and MADDC=MAX(abs(G1−G4), abs(G2−G3), abs(R1−R4), abs(R2−R3), abs(C−D)/2), for the blue color component;
and
  If non-directional filter is used MADDC=MAX(abs(G1−G4), abs(G2−G3), abs(B1−B4), abs(32−B3), abs(A−B)/2, abs(C−D)/2), for the red color component, and MADDC=MAX(abs(G1−G4), abs(G2−G3), abs(R1−R4), abs(R2−R3), abs(A−B)/2, abs(C−D)/2), for the blue color component.
Above, the notation abs( ) indicates an absolute value, and MAX(x,y,z) indicates the largest of x, y and z.
It should be noted that the values of Thr1, Thr2 and Thr3 are exemplary values for carrying out the preferred embodiments as described in Section A and Section B. These values can be different.

To facilitate the improvement of a raw Bayer matrixed image, it is preferred that an image processing system, as shown in FIG. 5, is used. The image processing system 5 comprises a sub-system 30 and an edge detection unit 40. The sub-system 30 comprises a noise filtering unit 32 and an adjustment unit 34. As shown in FIG. 5, the raw Bayer matrixed image 110, which is provided by an imaging device 10, is separated by a color separation unit 20 into three color components represented by signals 121, 122 and 123. For example, the signal 121 is indicative of the green color component. As the signals 121, 122, 123 are conveyed to the system 5, they are processed by the noise filtering unit 32 to become noise-filtered color components, represented by signals 131, 132, 133. At the same time, the edge detection unit 40 extracts from the signals 121, 122 and 123 information indicative of edges or lines in the image 110. The extracted information is represented by signals 141, 142, 143. For example, if the green color component is filtered by the noise filtering unit 32, responsive to the signal 121, then the information 142 or 143 will be used by the adjustment unit 34 to adjust the pixel values in the noise-filtered color component represented by the signal 131. After all three noise-filtered color components are adjusted by the adjustment unit 34, they are provided, as signals 151, 152 and 153 to a CFA unit for CFA interpolation.

It should be noted that all the components 10, 20, 32, 34, 40 and 50 can be part of an imaging system, but they can be disposed in two or more physically unconnected systems. For example, the image 110 from the imaging device 10 can be conveyed to the color separation unit 20 via a wired connection or in a wireless manner. Likewise, the color components from the color separation unit 20 can be conveyed to the image processing system 5 through the Internet, via a recording medium or using infrared signals. Furthermore, the system 5 can be implemented as a single device having a single computer program to carry out the tasks of noise filtering, edge detection and pixel value adjustment.

Figure 6:
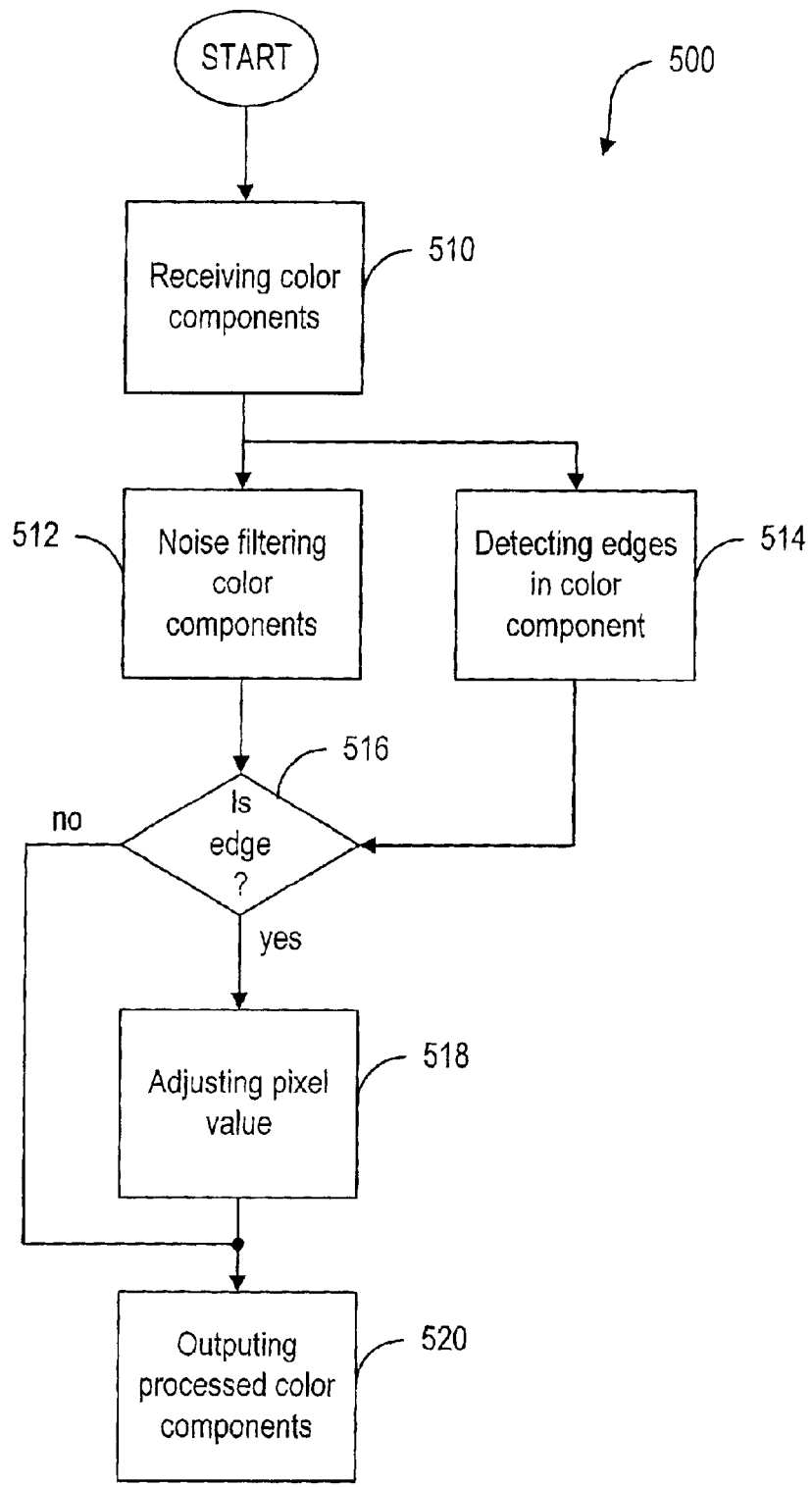
FIG. 6 is a flow chart showing a method for noise filtering a color image, according to the present invention.

The method of improving an image, according to the present invention, can be summarized in a flowchart, as shown in FIG. 6. As shown in FIG. 6, the method 500, starts at step 510 where the signals 121, 122 and 123 indicative of the three color components are received by the image processing system 5. Responsive to the received signals, the noise filtering unit 32 filters the color components at step 512 for providing the noise-filtered color components and the edge detection unit 40 detects edges in the color components at step 514. If edges are found, as determined at step 516, then the pixel values of the pixels in one color component located near the edges in the other color components are adjusted by the adjustment unit 34 at step 518. At step 520, the color components, as processed by the noise filtering unit 32 and adjusted by the adjustment unit 34 based on edge information provided by the edge detection unit 40, are conveyed, directly or indirectly, to a CFA unit for CFA interpolation.

Figure 7:
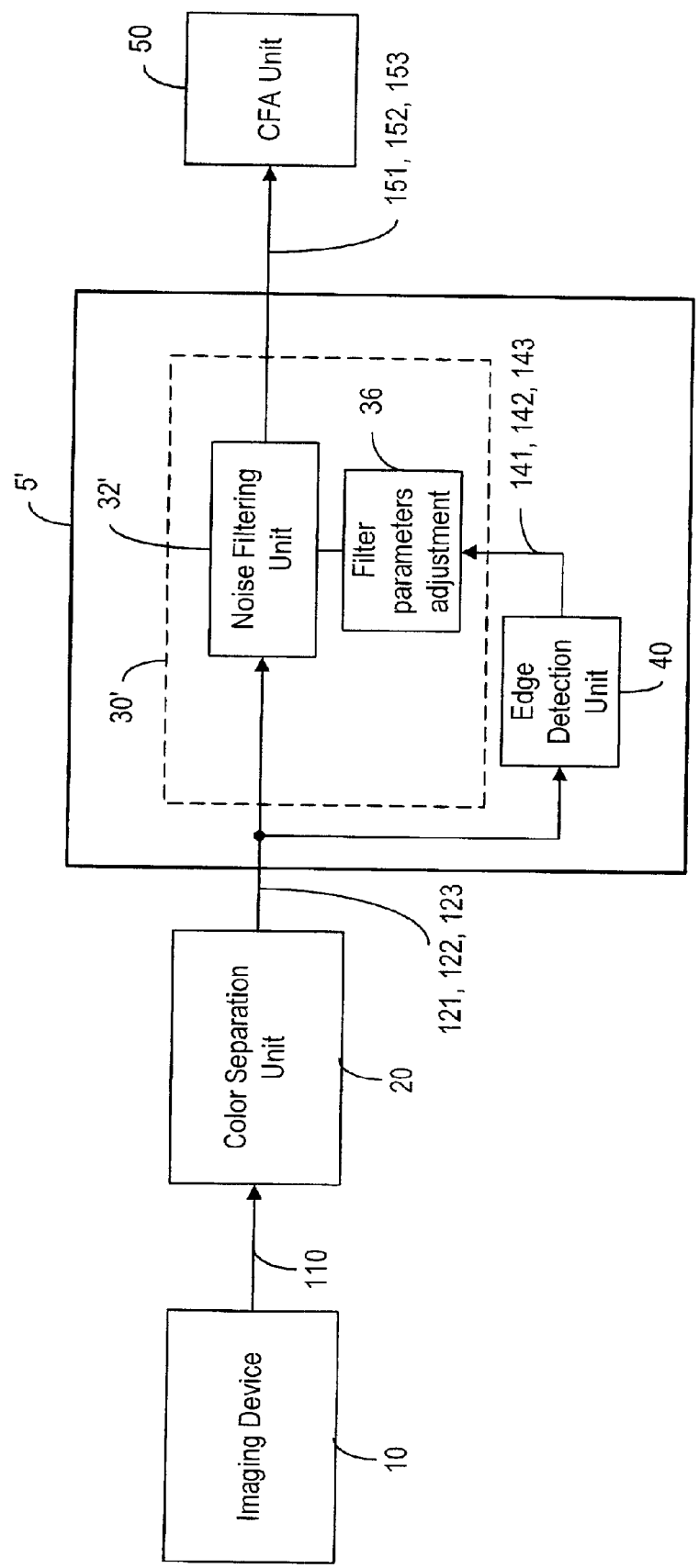
FIG. 7 is a block diagram showing a system for noise filtering a color image, according to another embodiment of the present invention.

FIG. 7 shows an image processing system 5', according to another embodiment of the present invention. As shown, the image processing system 5' comprises a subsystem 30' and an edge detection unit 40. The subsystem 30' comprises a noise filtering unit 32' that uses a noise filter (see FIG. 9a) having a plurality of filter parameters and a parameter adjustment module 36. As the edge detection unit 40 extracts from the signals 121, 122 and 123 information indicative of edges or lines in the image 110, the edge detection unit 40 provides the extracted information 141, 142, 143 to the subsystem 30'. Based on the extracted information 141, 142, 143, the parameter adjustment module 36 adjusts the filter parameters of the noise filter in the noise filtering unit 32'. For example, one of the filter parameters is adjusted by using the information from the adjustment module 36. The modified noise filter is shown in FIG. 9b. Alternatively, if the noise filter is a median filter, the properties of the median filter (like the pixels whose values are used for filtering) can be altered by using the information from the adjustment module 36.

Figure 8:
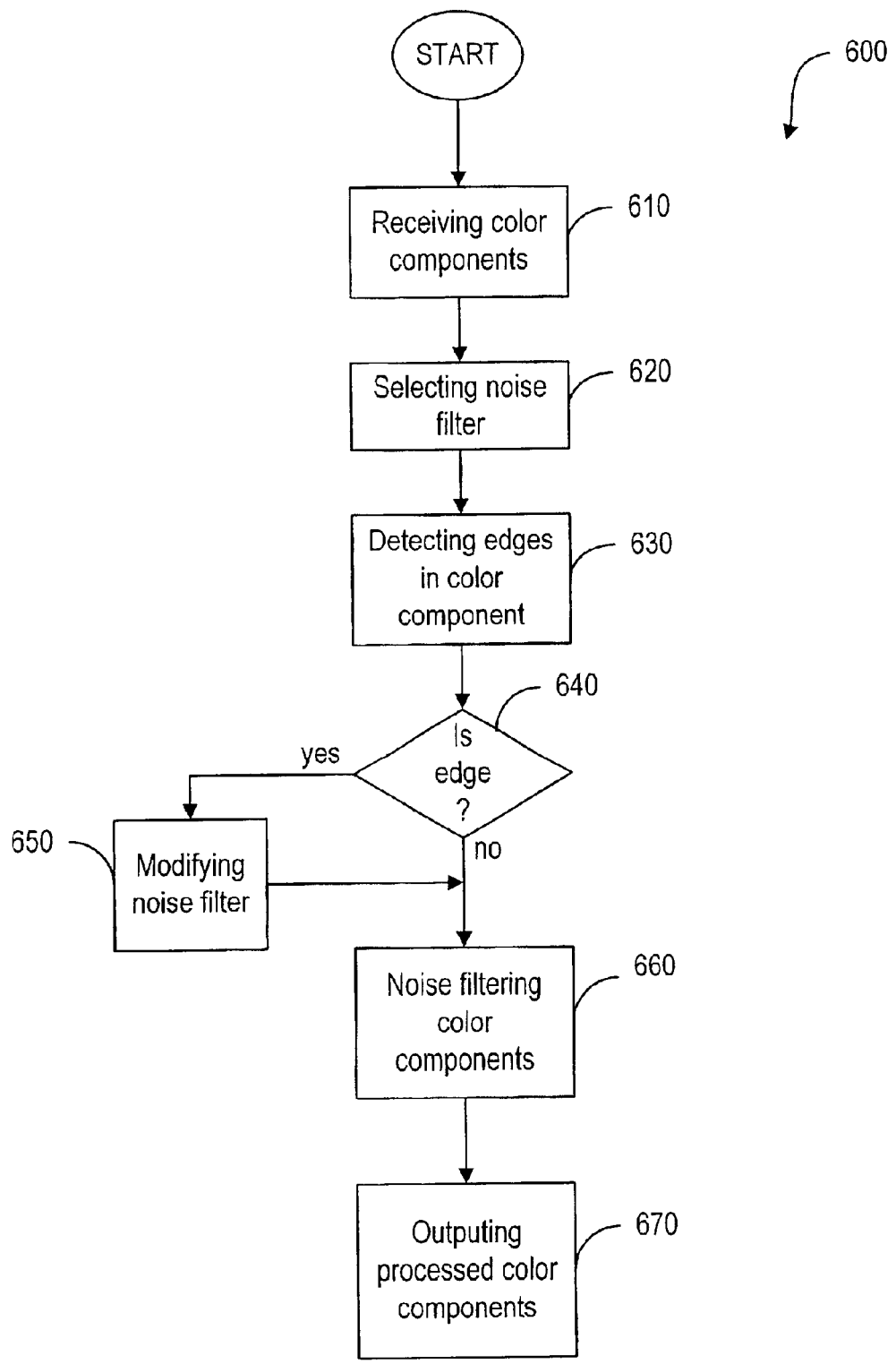
FIG. 8 is a flow chart showing a method for noise filtering a color image, according to another embodiment of the present invention.

The method 600 of improving an image, according to the other embodiment, is shown in FIG. 8. As shown, the method 600 starts at steps 610 and 620, wherein signals indicative of the three color components are received in the image processing system 5' and a noise filtering unit 32' based on a noise filter (FIG. 9a, for example) having a plurality of filter parameters is used for filtering the three color components. The edge detection unit 40 is used to detect edges in the color components at step 630. If edges are found, as determined at step 640, then one or more of the filter parameters is adjusted at step 650 to provide a modified noise filter (FIG. 9b, for example). The modified noise filter is used to filter the color components at step 660. Otherwise, the original filter (FIG. 9a) is used at step 660.

In connection with FIGS. 7 and 8, it should be understood that the filter parameters of the unit 32' can be indicative of the filter parameters to be used, such as presented in FIGS. 9a and 9b, or they can be indicative of the pixels whose values are to be used in filtering. They can even be indicative of the filter or filter type to be used in filtering.

Alternatively, the edge information provided by the edge detection unit 40 is used to adjust the pixel values of the pixels near the locations of the edges, and then an unadjusted noise filter is used to filter all pixels. In that way, the pixels are pre-filtered using the edge information in order to provide pixel value compensation in foreseeable noise filtering.

The method and system for improving an image, according to the present invention, have been described in the context of a Bayer matrixed image, wherein the pixel locations of one color component and the pixel locations of other color components do not overlap. In other words, a pixel in the green color component is located in a pixel location different from the pixel location occupied by any pixel in the red or blue color component. However, the same method and system can be used to process color components that have overlapping pixel locations so long as the adjustment of the noise filtered pixel values in one color component is based on the edge information extracted from one or two other color components. Moreover, the algorithm for noise filtering of color components are lowpass spatial filters, which can be based on linear spatial filters, non-linear filters or the combinations thereof. The algorithm for edge detection can be based on direction or non-direction spatial filters.

The invention is based on the observation that in many images the locations of edges across different color components are highly correlated, i.e., the edges are present in all color components, whereas the noise is not correlated across the color components, especially in systems where the pixels of different color components are not co-located.

The method, according to the present invention, can be applied to 3-dimensional images, as well. For example, in medical imaging there might arise a situation where one image component is present at certain locations and another at different locations, i.e., they are different modalities of the image. Then, edge information (whether 2-D or 3-D) is used to adjust the noise filtering (2-D or 3-D). Other examples may be radar images and images taken from material structure, etc. The method can also be applied to video images so that the edges are detected from one image (preferably the I-frame) and the noise filtering (if carried out) is controlled by this information in multiple images. The noise filtering process may also comprise averaging over a few images, if there is a static area in the image. Of course, noise filtering cannot be controlled by an edge from a different frame in a moving part of the image being filtered.

Furthermore, the present invention is applicable to an imaging system using different wavelengths to acquire an image. These wavelengths can be in the radio frequency range, in the infrared or ultraviolet spectral regions.

Thus, although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method of improving an image separable into at least a first color component and a second color component, the first color component having pixels located at a plurality of first pixel locations and a second color component having pixels located at a plurality of second pixel locations, said method comprising the steps of:

noise filtering the first color component using pixel values of the first color component for providing a noise-filtered color component having filtered pixel values at the plurality of first pixel locations, and adjusting the filtered pixel value of at least one first pixel location of the noise-filtered color component using information indicative of a difference in pixel values of the second color component at the second pixel locations adjacent to said at least one first pixel location.

2. The method of claim 1, wherein the difference in the pixel values is indicative of an edge in the image.

3. The method of claim 1, wherein the image has a first number of pixels and at least one of the first and second color components has at most a second number of pixels smaller than the first number.

4. The method of claim 1, wherein the plurality of first pixel locations are different from the plurality of second pixel locations.

5. The method of claim 1, wherein the image is separable into three color components in red, green and blue, and wherein the first color component is the red component and the second color component is the green component.

6. The method of claim 1, wherein the image is separable into three color components in red, green and blue, and wherein the first color component is the blue component and the second color component is the green component.

7. The method of claim 1, wherein the image is separable into three color components in red, green and blue, and wherein the first color component is the green component and the second color component is the red component.

8. The method of claim 1, wherein the image is separable into three color components in red, green and blue, and wherein the first color component is the green component and the second color component is the blue component.

9. The method of claim 1, wherein the image is a color image acquired from a sensor array having a Bayer matrix disposed thereon for color filtering.

10. A device for improving an image separable into at least a first color component and a second color component, the first color component having pixels located at a plurality of first pixel locations and the second color component having pixels located at a plurality of second pixel locations, said device comprising:

means, for noise filtering the first color component using pixel values of the first color component for providing a noise-filtered color component having filtered pixel values at the plurality of first pixel locations and for providing signals indicative of the noise-filtered color component, and means, responsive to the signals, for adjusting the filtered pixel value of at least one first pixel location of the noise-filtered color component using information indicative at least of a difference in pixel values of the second color component at the second pixel locations adjacent to said at least one first pixel location.

11. The device of claim 10, wherein the difference is indicative of an edge in the image.

12. The device of claim 10, wherein the image has a first number of pixels and at least one of the first and second color components has at most a second number of pixels smaller than the first number.

13. The device of claim 10, wherein the plurality of first pixel locations are different from the plurality of second pixel locations.

14. The device of claim 10, wherein the image is separable into three color components of red, green and blue.

15. A computer program for improving an image separable into at least a first color component and a second color component, the first color component having pixel values located at a plurality of first pixel locations and the second color component having pixel values located at a plurality of second pixel locations, said computer program comprising:

a first algorithm for noise filtering the first color component using pixel values of the first color component for providing a noise-filtered first color component having filtered pixel values at the plurality of first pixel locations, and a second algorithm, for adjusting the filtered pixel value of at least one first pixel location of the noise-filtered first color component using information indicative at least of a difference in pixel values of the second color component at the second pixel locations adjacent to said at least one first pixel location.

16. The computer program of claim 15, wherein the difference in pixel values is indicative of an edge in the image.

17. The computer program of claim 15, wherein the plurality of first pixel locations are different from the plurality of second pixel locations.

18. The computer program of claim 15, wherein the image is separable into three color components of red, green and blue.

19. An image processing system having a color separation device for separating an image into at least a first color component and a second color component for providing a first signal indicative of the first color component and a second signal indicative of the second color component, wherein the first color component has pixels located at a plurality of first pixel locations and the second color component has pixels located at a plurality of second pixel locations, said system comprising:

a filtering unit, responsive to the first signal, for noise filtering the first color component using pixel values of the first color component for providing a noise-filtered color component having filtered pixel values at the plurality of first pixel locations and for providing a third signal indicative of the noise-filtered color component;

an edge detection unit, responsive to the second signal, for providing information indicative at least of a difference in pixel values of the second color component; and an adjustment device, responsive to the third signal and the information, for adjusting the filtered pixel value of at least one first pixel location of the noise-filtered color component based on the difference in pixel values at the second pixel locations adjacent to said at least one first pixel location.

20. The system of claim 19, wherein the difference in pixel values is indicative of an edge in the image.

21. A method of improving an image separable into at least a first color component and a second color component using a noise filter, wherein the first color component has pixels located at a plurality of first pixel locations and a second color component has pixels located at a plurality of second pixel locations, and wherein the noise filter comprises a plurality of filter parameters, said method comprising the step of adjusting at least one of the filter parameters in the noise filter for noise filtering the first color component using pixel values of the first color component for providing a noise-filtered color component having filtered pixel values at the plurality of the first pixel locations, wherein said adjusting is based on information indicative of a difference in pixel values of the second color component at the second pixel locations adjacent to at least one first pixel location for providing the filtered pixel value of said at least one first pixel location.

22. The method of claim 21, wherein the difference in pixel values is indicative of an edge in the image.

23. A device for improving an image separable into at least a first color component and a second color component using a noise filter, wherein the first color component has pixels located at a plurality of first pixel locations and a second color component has pixels located at a plurality of second pixel locations, and wherein the noise filter comprises a plurality of filter parameters for filtering the first color component using pixel values of the first color component for providing a noise-filtered first color component having filtered pixel values at the plurality of first pixel locations, said device comprising a module, capable of modifying the noise filter before or during the filtering of the first color component, by adjusting at least one filter parameter using information indicative of a difference in pixel values of the second color component at the second pixel locations adjacent to at least one first pixel location, for providing the filtered pixel value of said at least one first pixel location.

24. The device of claim 23, wherein the difference in pixel values is indicative of an edge in the image.

25. A computer program for improving an image separable into at least a first color component and a second color component using a noise filter, wherein pixels of the first color component are located at a plurality of first pixel locations and pixels of the second color component are located at a plurality of second pixel locations, and wherein the noise filter comprises a plurality of filter parameters, said computer program comprising an algorithm for noise filtering the first color component using pixel values of the first color component for providing a noise-filtered first color component having filtered pixel values at the plurality of first pixel locations, wherein information indicative of a difference in pixel values of the second color component at the second pixel locations adjacent to at least one first pixel location is used to adjust at least one of the filter parameters of the noise filter for providing the filtered pixel value of said at least one first pixel location.

26. An image processing system having a color separation device for separating an image into at least a first color component and a second color component for providing a first signal indicative of the first color component and a second signal indicative of the second color component, wherein the pixels of the first color component are located at a plurality of first pixel locations and the pixels of the second color component are located at a plurality of second pixel locations, said system comprising:

an edge detection unit, responsive to the second signal, for providing information indicative at least of an edge in the image for providing a third signal indicative of the information; and a filtering unit using a noise filter having a plurality of filter parameters for noise filtering the first color component for providing a noise-filtered first color component having filtered pixel values at the plurality of first pixel locations, responsive to the first and third signals, for adjusting at least one of the filter parameters in the noise filter before or during the filtering of the first color component based on the information.

27. The system of claim 26, wherein the information is based on a difference in pixel values of the second color component at the second pixel locations adjacent to at least one first pixel location and said adjusting is for providing the filtered pixel value of said at least one first pixel location.

28. A method of improving an image using a noise filter having a plurality of filter parameters, wherein the image comprises a sequence of image frames of which at least one frame has at least one preceding frame, and each of said at least one frame and said at least one preceding frame is separable into at least a first color component and a second color component, and wherein the first color component has pixels located at a plurality of first pixel locations and a second color component has pixels located at a plurality of second pixel locations, said method comprising the step of adjusting at least one of the filter parameters in the noise filter for noise filtering the first color component of said at least one frame using pixel values of the first color component for providing a noise-filtered color component having filtered pixel values at the plurality of first pixel locations, wherein said adjusting is based on information indicative of a difference in pixel values of the second color component of said at least one preceding frame at the second pixel locations adjacent to at least one first pixel location for providing the filtered pixel value of said at least one first pixel location.

29. The method of claim 28, wherein the difference in pixel values is indicative of an edge in the image.

30. The method of claim 28, wherein the image is a video image.

31. A device for improving an image using a noise filter, wherein the image comprises a sequence of image frames of which at least one frame has at least one preceding frame, and each of said at least one frame and said at least one preceding frame is separable into at least a first color component and a second color component, and the first color component has pixels located at a plurality of first pixel locations and a second color component has pixels located at a plurality of second pixel locations, and wherein the noise filter comprises a plurality of filter parameters for filtering the first color component of said at least one frame using pixel values of the first color component for providing a noise-filtered color component having filtered pixel values at the plurality of first pixel locations, said device comprising a module, capable of modifying the noise filter before or during the filtering of the first color component of said at least one frame, by adjusting at least one of the filter parameters in the noise filter using information indicative of a difference in pixel values of the second color component of said at least one preceding frame at the second pixel locations adjacent to at least one first pixel location, for providing a modified noise filter for filtering the first color component of said at least one frame for providing the filtered pixel value of said at least one first pixel location.

* * * * *